US010640063B2

(12) United States Patent
Binder et al.

(10) Patent No.: US 10,640,063 B2
(45) Date of Patent: May 5, 2020

(54) ELECTRICAL LOAD FOR A MOTOR VEHICLE

(71) Applicant: Mahle International GmbH, Stuttgart (DE)

(72) Inventors: Tobias Binder, Stuttgart (DE); Markus Cramme, Wildberg (DE); Michael Krappel, Stuttgart (DE)

(73) Assignee: Mahle International GmbH (DE)

( * ) Notice: Subject to any disclaimer, the term of this patent is extended or adjusted under 35 U.S.C. 154(b) by 185 days.

(21) Appl. No.: 15/747,758

(22) PCT Filed: Jul. 26, 2016

(86) PCT No.: PCT/EP2016/067776
§ 371 (c)(1),
(2) Date: Jan. 25, 2018

(87) PCT Pub. No.: WO2017/017092
PCT Pub. Date: Feb. 2, 2017

(65) Prior Publication Data
US 2018/0222409 A1 Aug. 9, 2018

(30) Foreign Application Priority Data
Jul. 30, 2015 (DE) ........................ 10 2015 214 523

(51) Int. Cl.
*B60R 16/03* (2006.01)
*H02J 9/06* (2006.01)
(Continued)

(52) U.S. Cl.
CPC ................ *B60R 16/03* (2013.01); *B60L 1/00* (2013.01); *B60L 50/50* (2019.02); *B60L 58/20* (2019.02);
(Continued)

(58) Field of Classification Search
CPC ............... B60R 16/00; B60L 1/00; B60L 3/00
(Continued)

(56) References Cited

U.S. PATENT DOCUMENTS

| 4,044,268 A | 8/1977 | Hammel et al. |
| 4,044,628 A * | 8/1977 | Jacks ................. F16F 15/1213 74/574.2 |

(Continued)

FOREIGN PATENT DOCUMENTS

| DE | 10255449 A1 | 6/2004 |
| DE | 10330451 B3 | 9/2004 |

(Continued)

OTHER PUBLICATIONS

English abstract for EP-0402834.
English abstract for DE-102013225097.

*Primary Examiner* — Hal Kaplan
*Assistant Examiner* — Joseph N Inge
(74) *Attorney, Agent, or Firm* — Fishman Stewart PLLC

(57) ABSTRACT

An electrical load, for example and electrical component and/or an electronic component, of a motor vehicle may include a first electrical system part and a second electrical system part for supplying the electrical load with electrical energy from a first vehicle electrical system and a second vehicle electrical system, respectively. The first vehicle electrical system part may be electrically coupled to a diode element for transferring an activation signal to an electrical energy supply unit provided in the second electrical system part. The electrical energy supply unit may be switched between an active state where a supply voltage is provided to the electrical load and an idle state where the supply voltage to the electrical load is suspended.

20 Claims, 1 Drawing Sheet

(51) Int. Cl.
  *H02J 1/10* (2006.01)
  *B60L 1/00* (2006.01)
  *B60L 50/50* (2019.01)
  *B60L 58/20* (2019.01)
  *B60R 16/023* (2006.01)

(52) U.S. Cl.
  CPC .............. *B60R 16/023* (2013.01); *H02J 1/10* (2013.01); *H02J 9/061* (2013.01); *Y02T 10/7005* (2013.01); *Y02T 10/7066* (2013.01)

(58) Field of Classification Search
  USPC ........................................................ 307/10.1
  See application file for complete search history.

(56) References Cited

U.S. PATENT DOCUMENTS

| | | | |
|---|---|---|---|
| 7,129,759 B2 | 10/2006 | Fukami | |
| 7,196,431 B2 | 3/2007 | Eckert et al. | |
| 7,310,006 B2 | 12/2007 | Shimada | |
| 2005/0029867 A1* | 2/2005 | Wood | H02J 1/08 307/10.1 |
| 2006/0152090 A1 | 7/2006 | Hubert et al. | |
| 2012/0306263 A1* | 12/2012 | Tashiro | B60L 58/20 307/9.1 |
| 2014/0001837 A1* | 1/2014 | Zhang | B60L 58/14 307/9.1 |
| 2015/0239411 A1* | 8/2015 | Nakajima | B60R 16/033 307/10.6 |
| 2016/0101748 A1* | 4/2016 | Ambrosio | B60R 16/03 307/10.1 |
| 2018/0208066 A1* | 7/2018 | Rao | B60L 3/00 |

FOREIGN PATENT DOCUMENTS

| | | | | |
|---|---|---|---|---|
| DE | 102004061326 A1 | | 9/2005 | |
| DE | 102005054949 A1 | | 7/2006 | |
| DE | 102013225097 A1 | * | 6/2015 | .............. B60L 53/14 |
| DE | 102013225097 A1 | | 6/2015 | |
| EP | 0402834 A2 | * | 12/1990 | ............... H02J 1/10 |
| EP | 0402834 A2 | | 12/1990 | |

* cited by examiner

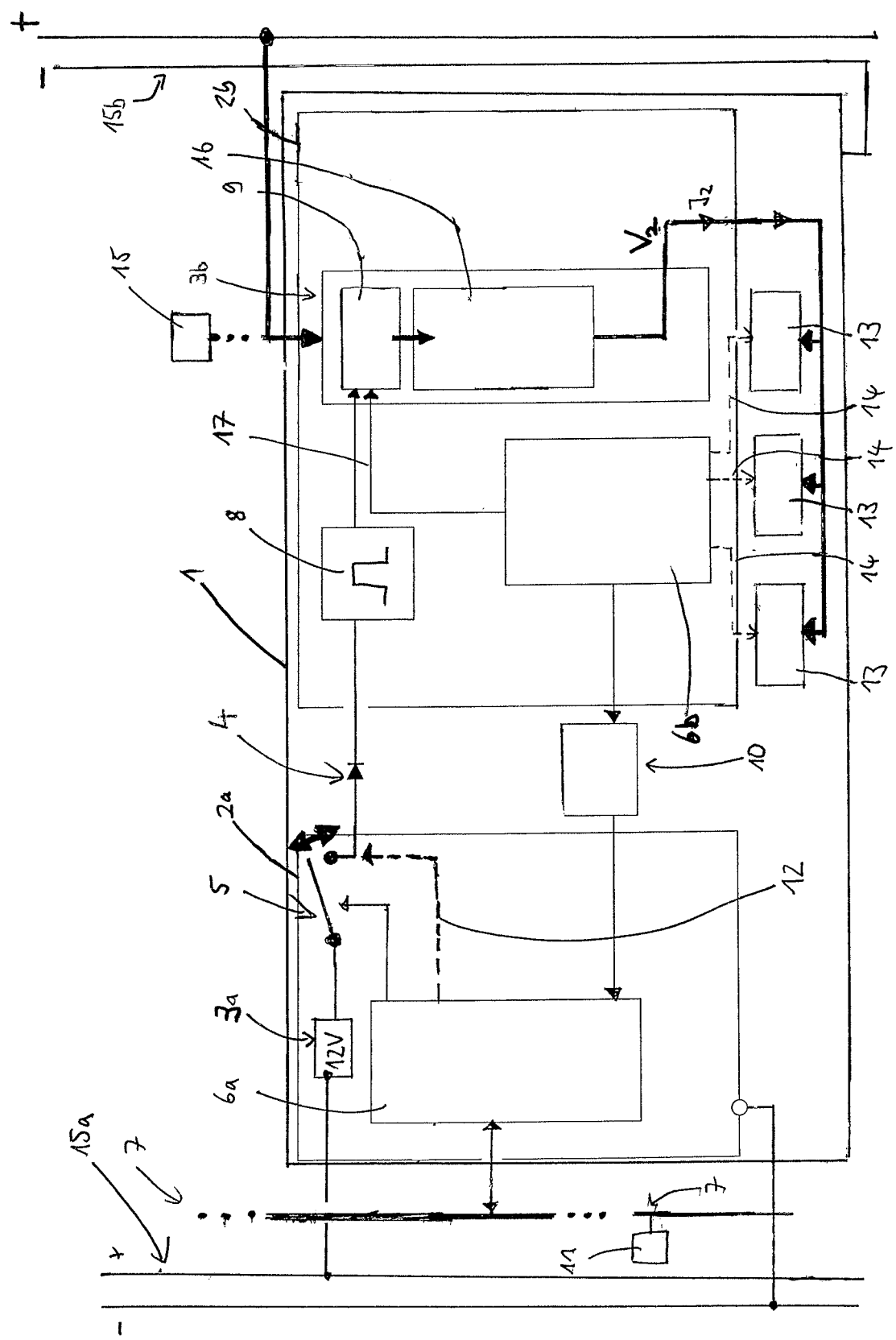

ELECTRICAL LOAD FOR A MOTOR VEHICLE

CROSS-REFERENCE TO RELATED APPLICATIONS

This application claims priority to International Application No. PCT/EP2016/067776 filed on Jul. 26, 2016, and German Application No. DE 10 2015 214 523.9 filed on Jul. 30, 2015, the contents of each of which are hereby incorporated by reference in their entirety.

TECHNICAL FIELD

The present invention relates to an electrical load for a motor vehicle and a motor vehicle with at least one such electrical load.

BACKGROUND

In modern motor vehicles, in the foreseeable future at least two different vehicle electrical systems are coming into use, for example a 12V vehicle electrical system and a 48V vehicle electrical system, which supply different electrical/electronic loads of the motor vehicle with the electrical supply voltage which is required by them. In order to conserve the energy supply units of the motor vehicle—usually rechargeable batteries—when the motor vehicle is in a parked state, and consequently can not be recharged during driving operation by means of a generator, installed in the motor vehicle, the electrical loads present in the motor vehicle can be switched between an active state and a so-called idle state. In other words, the electrical loads are able to separate themselves electrically from the respective vehicle electrical system by means of an electrical/electronic switch or by the use of suitable integrated circuits (ICs) in the manner of voltage converters, communication ICs, etc., or are able to at least shift into a state of greatly reduced current drain. Said idle state is therefore distinguished by a greatly reduced electrical energy consumption of the respective electrical load. In particular, in this way an undesired complete discharging of the energy supply units is prevented, when the motor vehicle is in parked state.

In contrast, in the active state the electrical loads are connected to at least one vehicle electrical system. Consequently, at least one vehicle electrical system can provide the electrical load with electrical energy. In order to switch the electrical load from the idle state into the active state, which corresponds to a so-called "wake-up"—therefore a "waking up"—from the idle state, an electrical/electronic switch, which separates the electrical load from the vehicle electrical system, is switched into a closed state, so that the electrical load is electrically connected, for the supply of energy, to the vehicle electrical system. Such a switch is typically part of a vehicle electrical system part of the electrical load, via which the load draws electrical energy from a particular vehicle electrical system. For each vehicle electrical system, from which the electrical load is to draw electrical energy, an individual vehicle electrical system part can be provided.

For the case where the motor vehicle has several loads, such a wakeup signal must be conveyed individually to vehicle electrical system parts, and each vehicle electrical system part must be switched separately from the idle state into the active state. A corresponding activation signal can be provided to the electrical load of the motor vehicle for example by a CAN- or LIN bus system present in the motor vehicle. However, such a bus system is generally only associated with a particular vehicle electrical system or respectively is referenced to its voltage level.

It proves to be problematic here to pass this wakeup signal on to all further vehicle electrical system parts of the electrical load, if for example galvanically separated or at least low leakage current interfaces are used here between the vehicle electrical system parts, which would already have to be supplied with electrical energy for the function, i.e. would already have to be "woken up", therefore activated, before the actual wake-up.

SUMMARY

The present invention is therefore concerned with the problem of indicating new ways in the supply of an electrical load of a motor vehicle with electrical energy from at least two different vehicle electrical systems.

This problem is solved by the subject of the independent claim(s). Preferred embodiments are the subject of the dependent claims.

Accordingly, the basic idea of the invention is to couple a first vehicle electrical system part with a second vehicle electrical system part by means of a diode element, so that the activation signal can be transferred via the diode element from the first vehicle electrical system part to the second vehicle electrical system part. By means of the diode element, the transmission of the said activation signal from the first to the second vehicle electrical system part can be realized in a technically simple manner. An essential advantage in the use of a diode element consists in that the formation of undesired electrical leakage currents between the two vehicle electrical system parts can be largely or even completely prevented. The separate coupling of all vehicle electrical system parts present in the electrical load to a bus system can be dispensed with in this way.

To generate the above-mentioned activation signal, which can be for example an electrical square wave signal or else a permanently applied voltage level, in the second vehicle electrical system part, which is to be "woken up" from the idle state by the first vehicle electrical system part, an electrical energy supply unit is present, which—owing to its arrangement in the second vehicle electrical system part—is designated below as "second electrical energy supply unit". The second energy supply unit can comprise a driver module, for example a discrete DC/DC converter. The second energy supply unit can further comprise a MOSFET driver with integrated electrical energy source (DC/DC converter, linear regulator, etc.), which serves for the provision of electrical energy from the second vehicle electrical system. The second electrical energy supply unit is designed according to the invention in such a way that it switches from the idle state to the active state when the activation signal is received from the first vehicle electrical system part. This switching can be realized for example such that said driver module, on receiving of the activation signal, produces in the manner of an electrical switch an electrical connection between the second vehicle electrical system part and the second vehicle electrical system.

In the electrical load according to the invention therefore by means of the diode element, which is essential to the invention, an indirect activation of the second vehicle electrical system part is realized, which is separated galvanically or high-resistively from the first vehicle electrical system part. For the case where in the first vehicle electrical system part, for example via the bus system of the motor vehicle, the activation signal is generated, the latter can be transferred to the second vehicle electrical system part by means of the coupling, proposed here, via the diode element. A separate provision or respectively generation of the activation signal in the first vehicle electrical system part, in particular in cooperation with the bus system of the motor vehicle, is dispensed with in the electrical load according to the invention which is proposed here.

It is conceivable to realize the activation signal in the form of an electrical voltage pulse or voltage level, which is transferred via the diode element from the first vehicle electrical system part to the second vehicle electrical system part. Such a voltage pulse is provided from an electronic assembly, for example a transceiver, after its having been woken up. The latter can also be further intensified by means of a switching element, upstream of the diode element, in the manner of a transistor, if higher voltage levels are necessary, for instance in order to configure the wakeup interface more robustly. Alternatively thereto, it is also conceivable to provide the activation signal through, in particular permanent, alteration of a voltage level in the electrical conduction path of the diode element. Further varied realization possibilities present themselves for the specialist in the art.

With suitable electrical polarity of the electrical voltage applied to the diode element, such that the diode element closes, an undesired electrical current flow between the two vehicle electrical system parts of the electrical load can be minimized via the diode element or even completely prevented. Against this background, it is also conceivable to additionally provide an ohmic resistance between the two vehicle electrical system parts electrically in series to the diode element, in order to additionally reduce leakage currents.

With corresponding configuration of the upstream transistor element, the latter can contribute to the minimizing, even complete prevention, of the current flow in the other polarity direction between the two vehicle electrical system parts. Therefore, leakage currents would be prevented or respectively minimized independently of the polarity or respectively flow direction of the leakage currents.

In each case, in the solution according to the invention which is proposed here, a technically complex coupling of the bus system to all vehicle electrical system parts present in the electrical load is dispensed with.

With the electrical load according to the invention, the second energy supply unit can comprise a switching element, for instance in the manner of a semiconductor switch, but also higher integrated circuits, for instance DC/DC converter or preferably MOSFET driver, by means of which the second vehicle electrical system part is activated and deactivated again. Such a switching element can be integrated for example into a DC-DC converter which is integrated into the second energy supply unit. This corresponds to the switching of the second energy supply unit from the idle state into the active state and vice versa. In other words, on generation of the activation signal in the first vehicle electrical system part and with a subsequent transfer of the activation signal from the first vehicle electrical system part to the second vehicle electrical system part, on receiving of the activation signal a switching on of the second energy supply unit of the second vehicle electrical system part is brought about. This means that electrical energy from the second vehicle electrical system is made available to the electrical load. Through the electrical coupling, essential to the invention, of the two vehicle electrical system parts by means of a diode element, the electrical coupling from the first to the second vehicle electrical system part can be produced in a simple manner. If in a "normal" or else also in another operating state, in which no activation signal is to be generated, an electrical voltage is applied to the diode element in reverse direction, so-called reverse voltage, undesirably high electrical leakage—or respectively cross currents are prevented.

To generate the activation signal, instead of the reverse voltage, an electrical voltage can be applied briefly to the diode element in forward direction, the so-called flux voltage. The previously mentioned "other operating states" can be, for example, faults such as an inadvertent reverse electrical polarity, but also particular test cases.

The use of a diode element essential to the invention permits as a result an electrical signal coupling, which is extremely simple to realize, between the two vehicle electrical system parts for the transfer of an activation signal.

In an embodiment which is able to be realized in a technically particularly simple manner, the diode element is a semiconductor diode. Such semiconductor diodes with suitable selection fulfil the specifications required in standards or guidelines with respect to undesired electrical leakage currents between the vehicle electrical system parts and are, moreover, also available commercially in large quantities and therefore at a favourable cost.

Particularly expediently, the semiconductor diode is arranged from the second to the first vehicle electrical system part in reverse direction. In this way, an undesired electrical leakage current from the second vehicle electrical system part to the first vehicle electrical system part, which is typically realized as a 12V or 48V vehicle electrical system part, can be largely or even completely prevented.

In a further preferred embodiment, in the first vehicle electrical system part a first control unit, connected electrically to the diode element, can be present. The first control unit is arranged to generate the activation signal and to transfer it electrically to the diode element. The first control unit is in communication connection with a bus system, in particular a LIN- or CAN bus system and is arranged/programmed in such a way that for generating the activation signal, on receiving of a switch-on signal from the bus system, it generates the activation signal and provides it to the diode element.

In an advantageous further development, in the first vehicle electrical system part an electrical switching element, upstream of the diode element, can be arranged. The switching element serves for the generation of the activation signal in the first vehicle electrical system part. For this, it is able to be switched by the first control unit between a closed state, in which the second energy supply unit is electrically connected to the diode element, and an open state, in which this connection is interrupted.

By a switching of the switching element into the closed state, an electrical voltage can be provided to the second vehicle electrical system part via the diode element, which electrical voltage is interpreted as an activation signal by the second vehicle electrical system part. Alternatively thereto, it is also conceivable to generate such an activation signal in the form of an electrical voltage pulse, by the switching element being switched by the first control unit for a predetermined period of time from the open into the closed state subsequently being switched into the closed state again.

Particularly expediently, in the second vehicle electrical system part a second control unit can be arranged, which in the active state, but not in the idle state, is supplied with electrical energy by the second energy supply unit. This means that the second control unit is automatically activated as soon as the second vehicle electrical system part is connected to the second vehicle electrical system and has therefore been "woken up" from the idle state. The second control unit, which can be configured in the manner of a microcontroller, is therefore available in active state of the second vehicle electrical system to carry out various further tasks such as for instance the controlling of further electrical units or respectively components within the electrical load. In the idle state of the second vehicle electrical system part, on the other hand, the second control unit is not supplied with electrical energy.

The second control unit, in particular if it is to be used as a microcontroller, can be in communication connection with the second energy supply unit in such a way that on receiving of an idle state signal it switches the second energy supply unit from the active state into the idle state. Such an idle state signal can be transmitted both via the communication bus from the exterior to the electrical load, and also, for instance by the microcontroller, can be generated itself, e.g. after a "timeout". The second control unit can therefore be used to switch the second vehicle electrical system part from the active state into the idle state again.

In order to inform the first vehicle electrical system part of such a completed deactivation of the first vehicle electrical system part, therefore a switching from the active state to the idle state, in a further preferred embodiment, a coupling means can be arranged between the two vehicle electrical system parts. Such a coupling, in terms of signalling, of the two vehicle electrical system parts takes place here in a galvanically separated manner, so that undesired electrical currents between the two vehicle electrical systems can be ruled out via the coupling means, or respectively undesired voltage level offsets between the vehicle electrical systems can not influence the signal transfer between the vehicle electrical system parts. By means of the coupling means, an idle state triggering signal can be transferred from the second vehicle electrical system part to the first vehicle electrical system part. Preferably, the transfer of the idle state actuation signal from the second control unit to the first control unit takes place when the coupling means is arranged in a suitable manner between the two control units. In this case, the coupling means couples the second control unit, present in the second vehicle electrical system part, with the first control unit, present in the first vehicle electrical system part.

The coupling means can be realized in a technically particularly simple manner, and therefore with particularly low manufacturing costs, by being equipped with an optocoupler or similar components having the same function, or with a capacitor. The coupling means can be arranged in such a way that it permits the transmission of digital signals between the two control units. In this case, the idle state confirmation signal can be transferred in digital form from the second to the first control unit. From there, optionally a further transfer to the bus system can take place, so that the idle state confirmation signal is also available on the bus system of the motor vehicle.

In a preferred embodiment, which is able to be realized in a technically particularly simple manner, only the second control unit is configured as a microcontroller, but not the first control unit. The microcontroller can undertake here various control functions in the second vehicle electrical system part and/or in the electrical load. For the configuration of the first control unit, on the other hand, in this embodiment no microcontroller has to be provided. This leads to considerably reduced manufacturing costs for the electrical loads.

In a further preferred embodiment, the first control unit can be configured as a communication unit for data transmission from the bus system and/or to the bus system. This means that the first control unit can receive from the bus system a communication signal, as a result of which it generates the activation signal, which is transferred via the diode element to the second control unit of the second vehicle electrical system part.

Particularly expediently, the first control unit can be configured as an integrated circuit. In this way, the manufacturing costs of the electrical load can be further reduced.

Preferably, vehicle electrical system parts can be configured respectively in such a way that in the idle state of the respective vehicle electrical system part, electrical current received from the respective energy supply unit does not exceed a predetermined maximum value. In this way, the electrical energy consumption in the respective vehicle electrical system part can be minimized.

To minimize the electrical energy consumption of the second vehicle electrical system, in a particularly preferred embodiment the predetermined maximum value of the electrical current can be 100 µA.

A further preferred embodiment proves to be particularly simple to realize technically, in which the switching element is a semiconductor switch, preferably a transistor, most preferably a field effect transistor, or comprises such.

Particularly expediently, a filter element can be arranged between the diode element and the (second) energy supply unit, which filter element acts as a low pass on the activation signal which is transferred via the diode element. In this way, undesired portions in the activation signal can be eliminated.

The invention relates furthermore to a motor vehicle with at least one previously presented electrical load.

Preferred example embodiments of the invention are illustrated in the drawings and are explained further in the following description.

BRIEF DESCRIPTION OF THE DRAWINGS

The FIGURE illustrates a circuit diagram of an electrical load of a motor vehicle according to an example.

DETAILED DESCRIPTION

The FIGURE illustrates in a presentation in the manner of a circuit diagram an example of an electrical load 1, according to the invention, of a motor vehicle. The electrical load 1 comprises a first vehicle electrical system part 2a for supplying the electrical load 1 with electrical energy from a first vehicle electrical system 15a. The electrical load 1 also comprises a second vehicle electrical system part 12b for supplying the electrical load 1 with electrical energy from a second vehicle electrical system 15b, different from the first vehicle electrical system 15a. In the electrical load 1 a diode element 4 is arranged, by means of which the first vehicle electrical system part 2a is coupled electrically to the second vehicle electrical system part 2b for the transfer of an activation signal. The diode element 4 can be a semiconductor diode, which is connected electrically from the first vehicle electrical system part 15a to the second vehicle electrical system part 2a, 2b in forward direction.

The second vehicle electrical system part 2b comprises a second energy supply unit 3b. The second energy supply unit 3b is electrically connected to a DC-DC converter 9, which as well as a driver module 16, downstream of the DC-DC converter 9, is part of the second electrical energy supply unit 3b. The second energy supply unit 3b can be switched between an active state, in which it provides the electrical load 1 with a second electrical supply voltage $V_2$, for example 48V, from the second vehicle electrical system 15b, and an idle state, in which the provision of the second electrical supply voltage $V_2$ to the electrical load 1 is cancelled. The driver module 16 provides the electrical load 1 with the electrical supply voltage $V_2$ when the second electrical energy supply unit 3b is in the active state.

The second electrical energy supply unit 3b is configured in such a way that on receiving the activation signal from the first vehicle electrical system part 2a it switches from the idle state into the active state. Such a switching of the second electrical energy supply unit 3b from the idle state into the active state takes place only if the second energy supply unit 3b is not in any case already in the active state. In the idle state of the second energy supply unit 3b or respectively of the second vehicle electrical system 2b, an electrical current $I_2$, provided by the second energy supply unit 3b of the second vehicle electrical system part 2b, from the second vehicle electrical system part 15b, does not exceed a predetermined maximum value. In the example scenario, this maximum value is 100 μA. In this way, the electrical energy consumption of the electrical load 1 can be minimized. This can be guaranteed for example by the configuration of the second energy supply unit 3b in such a way that the (second) supply voltage $V_2$, provided in the idle state by the (second) energy supply unit 3b of the second vehicle electrical system part 2b, does not exceed a predetermined maximum value, for example 10 mV.

In accordance with FIG. 1, a first control unit 6a, electrically connected to the diode element 4, is present in the first vehicle electrical system part 2a. For this, the first control unit 6a is arranged/programmed to generate the activation signal and to transfer it electrically to the diode element 4. For this, the first control unit 6a is in communication connection with a bus system 7, in particular a LIN- or CAN bus system, of the motor vehicle using the electrical load 1. In the example scenario of FIG. 1, the first control unit 6a is configured as an integrated circuit in the form of an IC module. This permits a favourably priced realization of the first control unit 6a as communication unit for data transmission between the first control unit 6a and the bus system 7. This means that the first control unit 6a can receive from the bus system 7 a communication signal, as a result of which it generates the activation signal, which is passed on via the diode element 4 to the second vehicle electrical system part 2b and leads there to the switching into the active state. The first control unit 6a is therefore arranged/programmed in the example of FIG. 1 in such a way that, for generating the activation signal on receiving of a switch-on signal from the bus system 7, it generates the activation signal and provides it to the diode element 4. Such a configuration permits the activation signal to be generated externally, for example in a control apparatus 11 connected to the bus system 7 outside the two vehicle electrical system parts 2a, 2b. In other words, the second vehicle electrical system part 2b of the electrical load 1 can be activated from the idle state by the external control apparatus 11 "remotely" via the bus system 7. A separate communication connection of the bus system 7 to the second vehicle electrical system part 2b, which is technically complex and therefore expensive in manufacture, can therefore be dispensed with.

Between the first control unit 6a and the diode element 4, therefore electrically upstream of the diode element 4, a switching element 5 is arranged in the manner of a semiconductor switch. The semiconductor switch can be configured as a transistor, in particular as a field effect transistor. The switching element 5 or respectively the semiconductor switch can be switched, for generating the activation signal by the first control unit 6a between a closed state, in which the first control unit 6a is electrically connected to the diode element 4, and an open state, in which this connection is interrupted. To generate the activation signal, the switching element 5 is switched by the first control unit 6a briefly from the open into the closed state. Through the brief connection, involved therewith, of the diode element 4 to the first control unit 6a, an electrical voltage pulse is generated in forward direction of the diode element 4, which is transferred via the diode element 4 to the second vehicle electrical system part 2b. In the example scenario, this electrical voltage pulse represents the activation signal according to the invention, which is received by the second energy supply unit 3b present in the second vehicle electrical system part 2b. Alternatively thereto, however, it is also conceivable to permanently close the switching element 5 for generation of the activation signal. In this case, the activation signal is configured as an electrical voltage signal with a constant voltage level.

Particularly expediently, a filter element 8 can be arranged between the diode element 4 and the second energy supply unit 3b. This can be configured in particular as an electrical and/or electronic filter element 8. By means of the filter element 8, undesired signal interferences, for instance so-called "voltage ripple", can be filtered out from the activation signal and in this way the signal quality of the activation signal can be improved. Preferably, the filter element 8 is configured in such a way that it acts as a low pass on the activation signal which is transferred via the diode element 4. In a variant of the example, the activation signal, for instance in the form of a 5V voltage level or 5V voltage pulse, can also be generated directly in the first control unit 6a and transferred via an electrical conduction path 12 (represented in dashes) to the diode element 4. In this case, the provision of the switching element 5 can be dispensed with.

In an analogous manner to the first control unit 6a in the first vehicle electrical system part 2a, also in the second vehicle electrical system part 2b a second control unit 6b is arranged. The second control unit 6b is supplied in the active state, but not in the idle state, by the second energy supply unit 3b with electrical energy from the second vehicle electrical system 15b. The second control unit 6b, which is preferably configured in the manner of a microcontroller, is therefore, in active state of the second vehicle electrical system part 2b, automatically available for carrying out various further tasks. For example, by means of the second control unit 6b, further electrical sub-loads 13 can be activated and with electrical energy, which is indicated in FIG. 1 by arrows with reference number 14.

In the idle state of the second vehicle electrical system part 2b, the second control unit 6b is not supplied with electrical energy from the second vehicle electrical system 15b. In other words, the second control unit 6b only consumes electrical energy when it is required within the second vehicle electrical system part 2b. The second control unit 6b, in particular when it is configured as a microcontroller as in the example scenario, can be in communication connection with the second energy supply unit 3b in such a way that the second energy supply unit 3b, on receiving an idle state signal, switches from the active state into the idle state. The second control unit 6b is therefore also used, if necessary, to deactivate the second vehicle electrical system part 2b again.

For this, an electrical control line 17 is provided between the second control unit 6b and the second energy supply unit 3b.

As can be further seen from FIG. 1, a coupling means 10 is present between the two vehicle electrical system parts 2a, 2b. By means of the coupling means 10, the first vehicle electrical system part 2a can be informed by the second vehicle electrical system part 2b of a completed deactivation, therefore a switching from the active state into the idle state. The coupling of the two vehicle electrical system parts 2a, 2b takes place here in a galvanically separated manner, so that undesired electrical (creepage- or leakage) currents are prevented between the two vehicle electrical system parts 2a, 2b via the coupling means 10. By means of the coupling means 10, an idle state confirmation signal is transferred from the second vehicle electrical system part 2b to the first vehicle electrical system part 2a. In the example of FIG. 1, the transfer of such an idle state actuation signal takes place from the second control unit 6b, configured as a microcontroller, to the first control unit 6a, configured as an integrated circuit (IC). To ensure the desired galvanic separation, it can be equipped with an optical coupling element, known to the specialist in the art as a so-called "optocoupler", or with an electrical capacitor. Furthermore, the coupling means 10 in the example scenario is configured as a digital communication unit, so that the idle state confirmation signal can be transferred as a digital signal between the two control units 6a, 6b. This permits a particularly simple signal forwarding to the bus system 7.

The invention claimed is:

1. An electrical load of a motor vehicle, comprising:
a first electrical vehicle electrical system supply providing electrical energy from a first vehicle electrical system and a second vehicle electrical system supply providing electrical energy from a second vehicle electrical system;
a diode element electrically coupled to the first vehicle electrical system supply to transfer an activation signal from the first electrical vehicle electrical system supply to an electrical energy supply provided in the second electrical vehicle electrical system supply that draws electrical energy from the second vehicle electrical system;
wherein the electrical energy supply is switchable between an active state where the electrical energy supply provides a supply voltage from the second vehicle electrical system, and an idle state where a provision of the supply voltage is suspended; and
wherein the electrical energy supply is operable to switch from the idle state to the active state when the activation signal is received from the first vehicle electrical system supply.

2. The electrical load according to claim 1, wherein the diode element is a semiconductor diode.

3. The electrical load according to claim 2, wherein the semiconductor diode is arranged to extend from the first electrical vehicle electrical system supply to the second electrical vehicle electrical system supply.

4. The electrical load according to claim 1, further comprising a first controller disposed in the first electrical vehicle electrical system supply and electrically connected to the diode element, the first controller arranged to provide the activation signal and transfer the activation signal electrically to the diode element;
wherein the first controller is in communication connection with a bus system, and wherein the first controller provides the activation signal and transfers the activation signal electrically to the diode element in response to receiving a switch-on signal from the bus system.

5. The electrical load according to claim 4, further comprising an electrical switching element arranged in the first vehicle electrical system supply upstream of the diode element, wherein the electrical switching element is switchable by the first controller for providing the activation signal between a closed state where the first controller is electrically connected to the diode element, and an open state where an electrical connection of the first controller to the diode element is interrupted.

6. The electrical load according to claim 4, further comprising a second controller arranged in the second electrical vehicle electrical system supply, wherein the second controller is supplied with electrical energy from the electrical energy supply in the active state of the electrical energy supply and not in the idle state of the electrical energy supply.

7. The electrical load according to claim 6, wherein the second controller and the electrical energy supply are in a communicative connection with one another such that the electrical energy supply switches from the active state into the idle state in response to receiving an idle state signal.

8. The electrical load according to claim 6, further comprising a coupling device disposed between the first electrical vehicle electrical system supply and the second electrical vehicle electrical system supply, the coupling device structured and arranged to provide a galvanically separated connection between the second vehicle electrical system supply and the first vehicle electrical system supply for transmitting an idle state confirmation signal, and wherein the coupling device couples the second controller to the first controller.

9. The electrical load according to claim 8, wherein the coupling device includes at least one of an optocoupler and an electrical capacitor.

10. The electrical load according to claim 6, wherein the second controller is configured as a microcontroller.

11. The electrical load according to claim 4, wherein the first controller unit includes a communication unit for data transmission from and to the bus system.

12. The electrical load according to claim 4, wherein the first controller is configured as an integrated circuit.

13. The electrical load according to claim 1, wherein at least one of:
the electrical energy supply provides an electrical current in the idle state that is below a predetermined maximum value; and
the electrical energy supply provides the supply voltage in the idle state that is below a predetermined maximum value.

14. The electrical load according to claim 13, wherein at least one of:
the predetermined maximum value of the electrical current is 100 µa; and
the predetermined maximum value of the supply voltage is 0.01V.

15. The electrical load according to claim 1, further comprising a filter element arranged between the diode element and the electrical energy supply, wherein the filter element is configured as a low pass on the activation signal transferred via the diode element.

16. A motor vehicle, comprising at least one electrical load, the at least one electrical load including:
a first vehicle electrical system and a second vehicle electrical system;

a first electrical vehicle electrical system supply providing the at least one electrical load with electrical energy from the first vehicle electrical system;

a second vehicle electrical system supply providing the at least one electrical load with electrical energy from the second vehicle electrical system;

an electrical energy supply provided in the second electrical vehicle electrical system supply, wherein the electrical energy supply draws electrical energy from the second vehicle electrical system;

a diode element electrically coupled to the first vehicle electrical system supply to transfer an activation signal from the first electrical vehicle electrical system supply to the electrical energy supply;

wherein the electrical energy supply is switchable between an active state where the electrical energy supply unit provides a supply voltage to the at least one electrical load from the second vehicle electrical system, and an idle state where a provision of the supply voltage is suspended; and wherein the electrical energy supply is operable to switch from the idle state to the active state when the activation signal is received from the first vehicle electrical system supply.

17. The motor vehicle according to claim 16, wherein the at least one electrical load includes at least one of an electrical component and an electronic component.

18. The electrical load according to claim 1, wherein the electrical energy supply comprises a MOSFET driver.

19. The electrical load according to claim 1, further comprising a coupling device disposed between the first electrical vehicle electrical system supply and the second electrical vehicle electrical system supply, the coupling device structured and arranged to provide a galvanically separated connection between the second vehicle electrical system supply and the first vehicle electrical system supply for transmitting an idle state confirmation signal.

20. The electrical load according to claim 4, wherein the bus system is a LIN bus system or a CAN bus system.

* * * * *